Oct. 17, 1950 E. G. WEBB 2,526,055
CLAMP DEVICE

Filed Nov. 8, 1946 2 Sheets-Sheet 1

INVENTOR
EARLE GRANT WEBB
BY
*Baid Freeman*
ATTORNEYS

Oct. 17, 1950  E. G. WEBB  2,526,055
CLAMP DEVICE
Filed Nov. 8, 1946  2 Sheets-Sheet 2
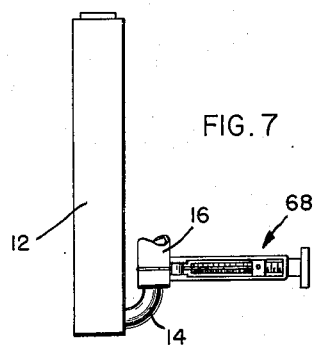
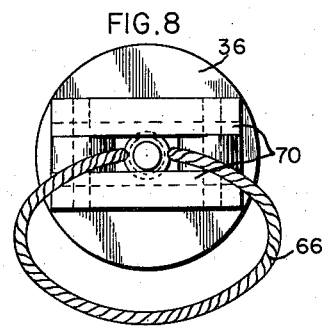
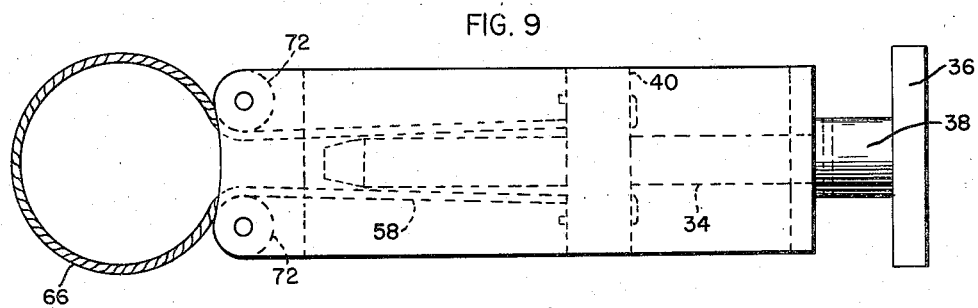
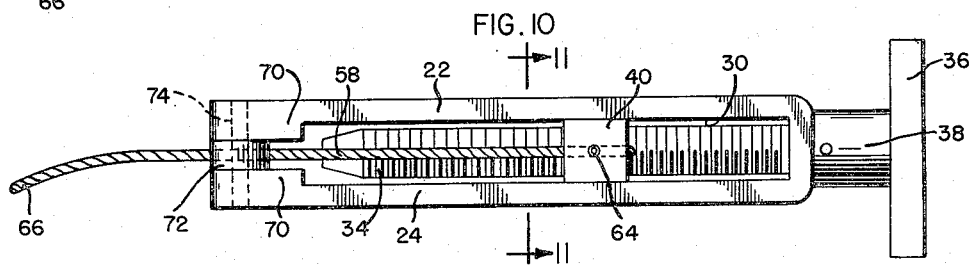
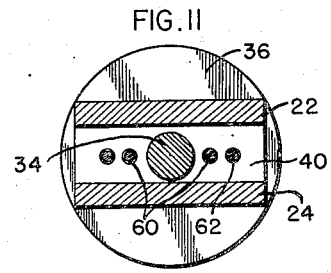
INVENTOR
EARLE GRANT WEBB
BY *Baird Freeman*
ATTORNEYS Patented Oct. 17, 1950

2,526,055

UNITED STATES PATENT OFFICE 2,526,055

CLAMP DEVICE

Earle Grant Webb, Bellevue, Nebr., assignor, by mesne assignments, to Inland Manufacturing Company, Omaha, Nebr., a corporation of Nebraska Application November 8, 1946, Serial No. 708,615

1 Claim. (Cl. 24—19)

This invention relates to temporary clamps, and has particular utility in clamping flexible hoses on pipe lines for a temporary purpose, such as for example in connection with cleaning of automobile radiators. In the process of cleaning the radiators water is forced through the radiator at high pressure, and it has been found to be very effective and helpful in the operation to introduce through the same supply conduit, when the radiator is substantially full of water, a supply of air under high pressure. Ordinary clamps are not effective for retaining the hose in position under the high pressures used, and the present device is well adapted for that purpose. The device can be used for other purposes, as will be understood by those skilled in the art.

One of the objects of the invention is the provision of a temporary clamp which will provide high compression for clamping objects.

Another object of the invention is the provision of such a device which can be easily and quickly applied to and removed from the object to be clamped.

The clamp includes a flexible cable which is the actual clamping element, and another object of the invention resides in the fact that such a flexible cable can be easily and quickly replaced if it should break or become defective.

Another object is the provision of a simple clamping device which can be manipulated by hand without the necessity of tools.

A further object of the invention resides in the fact that the clamp will draw and firmly and efficiently clamp a loose-fitting hose to a tight fit on another conduit.

Still another object is the provision of a clamp which will effectively clamp together irregularly shaped flexible conduits.

A further object of the invention is the provision of such a clamping device which is simple and rugged, and will not easily become broken.

A further object is the provision of means in such a clamping device for obtaining great mechanical advantage for applying great pressure.

With these and other objects in view, my invention consists in the construction, arrangement and combination of the various parts of my device whereby the objects contemplated are attained, as hereinafter more fully set forth, pointed out in the claim, and illustrated in the accompanying drawings, in which:

Figure 7 illustrates a modified form of clamp applied to the hose outlet connection of a radiator;

Figure 8 is an end view of the modified form shown in Figure 7;

Figure 9 is a top view of the device shown in Figure 8;

Figure 10 is a side view of the modified form; and

Figure 11 is a sectional view taken on line 11—11 of Figure 10.

Figure 1:
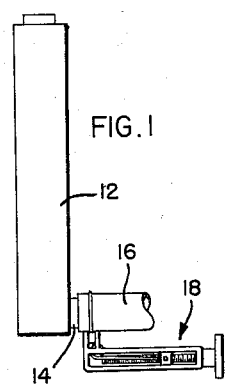
Figure 1 is a side view of an automobile radiator showing the preferred form of clamping device to the present invention applied to the hose outlet connection of the radiator.

Referring now in detail to the drawings, Figure 1 shows a radiator 12 of an automobile having an outlet fitting 14 at the bottom thereof, and a hose connection 16 fitted thereon. The clamping device of the preferred form is indicated generally at 18 in Figure 1, and is shown applied to the hose connection and clamping it in place on the outlet fitting.

The clamping device 18 includes a frame member 20, which includes a pair of flat plates 22 and 24 spaced vertically and interconnected at the ends by end pieces 26 and 28. The frame 20 may be of a single forged piece or it may be of separate elements welded together. The two flat plates 22 and 24 form between them a transverse slot or slideway 30 extending the length of the frame.

Formed in the end piece 26 of the frame is a bore 32 through which is inserted a threaded bolt 34, loosely rotatable therein. The outer end of the bolt 34 is provided with a knurled knob 36 for turning the bolt, a shoulder 38 being provided on the inner end for bearing against the end piece 26 of the frame. The bolt 34 extends substantially the full length of the slideway 30.

A locking block 40 is positioned transversely in the slot or slideway 30, and is so shaped to fill the slideway between the plates so that it will slide and bear on the inner surfaces of both of the plates. The length of the block 40 is substantially the width of the slideway. The locking block 40 is provided with a threaded opening for the reception of the threaded bolt 34.

Rotation of the bolt 34 thereby moves the block longitudinally of the slideway 30.

A roller 42 is mounted on a shaft or pin 44 in the plate 22 adjacent the end 28 of the frame. The shaft or pin 44 is positioned with its axis transverse to the slideway 30, and in the illustration shown is formed in the plate 22. The exact location of the pin 44 may be varied so long as the bottom surface of the roller 42 is disposed in the slideway 30. An opening 46 is cut in the plate 22 for positioning the roller 42, and for accommodating the flexible cable to be referred to later.

A pair of stub plates 48 and 50 are secured to the plate 22 and extend perpendicular thereto. The plate 48 may be, if desired, a continuation of the end 28 of the frame, and the plate 50 is spaced from the plate 48 longitudinally of the frame, a short distance to provide a space 52.

Figure 6:
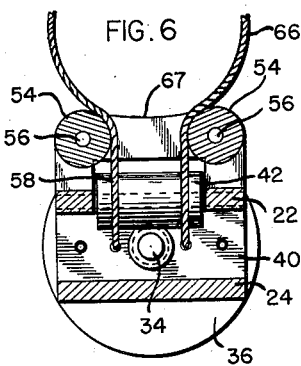
Figure 6 is a sectional view taken on line 6—6 of Figure 3.
Figure 3:
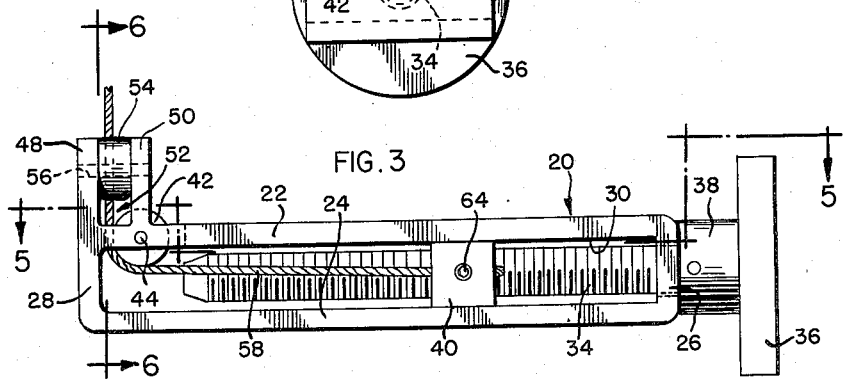
Figure 3 is a side view of the device of Figure 2.
Figure 4:
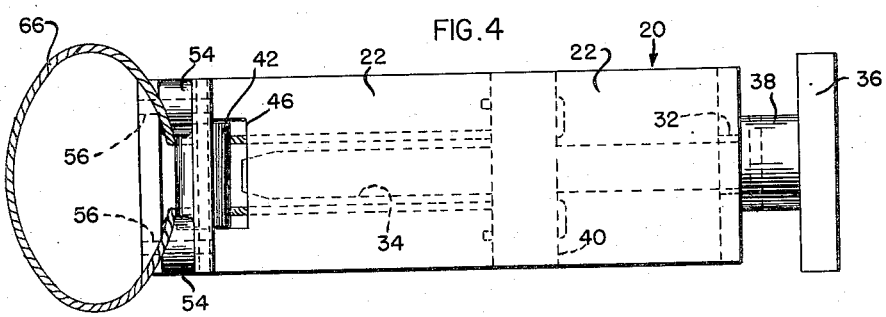
Figure 4 is a top view of the device of Figure 2.

A pair of rollers 54 are rotatably mounted between the stub plates 48 and 50, adjacent the lateral ends of the plates, and adjacent the ends of the roller 42, as may be seen in Figure 6. These rollers 54 are rotatably mounted on pins 56 disposed perpendicularly to the pin 44 on which roller 42 is mounted.

Figure 5:
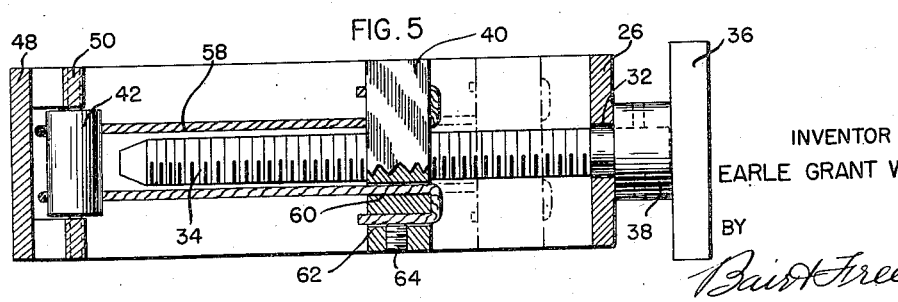
Figure 5 is a section taken on line 5—5 of Figure 3.

A flexible cable 58 is secured to the device for providing a clamping element. The ends of the cable 58 are secured in the locking block 40 by extending the ends of the cable through openings 60 and returning the ends through openings 62 spaced outwardly of the openings 60, as seen in Figure 5. A set screw 64 is threaded through each end of the locking block 40 and enters into the respective opening 62 for clamping the terminal end of the flexible cable. With the ends of the flexible cable turned back through the openings 62, considerable friction is provided for retaining the cable in place, when under tension.

The mid-section of the cable 58 forms a loop 66. This loop 66 is extended through the slideway 30, around the roller 42, through the space 52 between the stub plates 48 and 50, and finally through the space between the pair of rollers 54.

To use the device, the loop 66 is placed around the hose or other conduit to be clamped. This may be done by placing the loop over the hose before the hose is placed onto the conduit to which it is to be clamped. By turning the bolt 34 the locking block 40 is caused to be drawn along the slideway 30, which operation draws on the loop 66 and tightens it around the object to be clamped, such as the hose, and causing the latter to be clamped firmly around the conduit.

Figure 2:
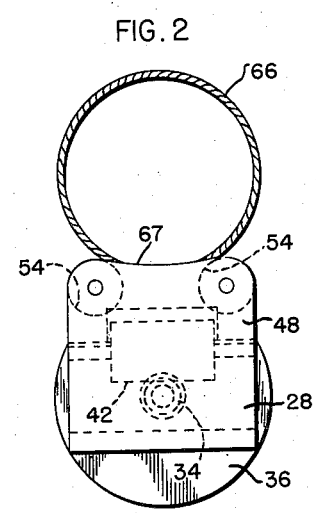
Figure 2 is an end view of the device shown in Figure 1.

The provision of the rollers 42 and 54 reduces friction of the cable as it is being drawn into the clamping device. When the loop 66 is placed around the object to be clamped, the strands of the loop bear outwardly against the rollers 54. The terminals of the loop are thereby brought close together, so that the loop almost completely surrounds the object to be clamped. The top edges of stub plates 48 and 50 are formed with slight arcuate recesses, 67, as seen in Figures 2 and 6, for seating of the hose 16, and obtaining maximum peripheral contact of the cable around said hose. By virtue of rollers 42 and 54, the device may be quickly and easily applied and adequate clamping pressure exerted with minimum physical effort.

The modified form of device shown in Figures 7 to 11, inclusive, is similar in most respects to the first form above described.

Figure 7 shows a radiator 12 having a return outlet 14 and a hose connection 16, similarly to Figure 1. The modified form of the device is shown generally at 68, and contains the same elements as the first form, except as specifically referred to hereinafter.

The plates 22 and 24 instead of having an end piece at their outer end are provided with thickened portions or shoulders 70 between which are journaled a pair of rollers 72, spaced laterally from each other. These rollers 72 are mounted on pins 74 secured in the thickened portions 70 of the plates and are disposed perpendicular to the length of the slideway 30. These rollers 72 are spaced apart similarly to and serve the same purpose as the rollers 54.

The loop 66 of the flexible cable has its continuing portions extending between and in contact with the respective rollers 72, with the terminal portions of the cable anchored to the block 40, in the manner above referred to in the first form of the device.

The operation and use of the device of the modified form is similar to the first form as above described, but it will be noted that the loop 66 of the present form is disposed in a different direction from the frame, namely, in the general direction of extent of the plates 22 and 24. In both forms of the device, the locking block 40 can be removed from the frame, by turning the bolt 34 out of the block. The bolt 34 can then be removed from the frame and the locking block 40 can also be removed together with the flexible cable 58. If the flexible cable 58 should become broken it can easily be replaced by loosening the set screws 64, and inserting another cable. It will be noted that different lengths of flexible cable can be employed, if desired, to accommodate various sizes of objects, thereby widening the field of use of the device. It will be noted also that with a single length cable a wide range of sizes of objects can be accommodated due to the length of the slideway 30 through which the locking block 40 can be moved.

The pitch of the thread of the bolt 34 is preferably low so as to provide increased mechanical advantage for applying great pressure to the object to be clamped.

While I have shown and described certain particular embodiments of my invention, it will be understood of course that I do not wish to be limited thereto since many modifications may be made, and I therefore contemplate, by the claim appended hereto, covering any such modifications or substitutions of equivalents as fall within the true spirit and scope of my invention.

I claim:

In a clamp device, an integral frame including a pair of elongated, flat plates and end pieces interconnecting the plates and spacing them apart, said plates forming a slideway therebetween, a first roller in one end of said frame with its axis disposed transverse to said slideway and parallel with said plates, said frame also including a pair of transversely disposed plate elements adjacent said first roller and spaced apart longitudinally of the frame, said plate elements extending at an angle to the frame, said frame having an opening communicating between said slideway and the space between said plate elements, a pair of laterally spaced rollers mounted in and between said plate elements, said frame having a bore at its end opposite said plate elements, a threaded bolt loosely slidable in said bore and extending longitudinally into said slideway, and substantially the full length thereof, said bolt having an abutment shoulder adapted to engage said end of the frame, a locking block having a threaded opening therethrough slidable in said slideway, said locking block having a length substantially the width of said slideway and a thickness substantially equal to the thickness of said slideway, said bolt being removably threaded through the opening in said locking block, and a flexible cable having its ends removably secured in said locking block, the midsection of said flexible cable forming a loop and adapted to extend around said first roller, through said opening, between said pair of rollers and out of the frame, said loop being adapted for surrounding an object to be clamped.

EARLE GRANT WEBB.

REFERENCES CITED

The following references are of record in the file of this patent:

UNITED STATES PATENTS

| Number | Name | Date |
|---|---|---|
| 398,935 | Beu | Mar. 5, 1889 |
| 459,921 | Wyttenbach | Sept. 22, 1891 |
| 1,386,109 | Hatfield | Aug. 2, 1921 |
| 1,406,443 | Cook | Feb. 14, 1922 |
| 1,786,107 | De Vulitch | Dec. 23, 1930 |
| 1,917,192 | Hueber | July 4, 1933 |
| 1,952,863 | Hueber | Mar. 27, 1934 |
| 2,149,395 | Glynn | Mar. 7, 1939 |
| 2,284,314 | Wetzler | May 26, 1942 |